United States Patent
Kobayashi et al.

(10) Patent No.: US 12,086,734 B2
(45) Date of Patent: Sep. 10, 2024

(54) MANUFACTURING ASSISTANCE APPARATUS

(71) Applicant: SUBARU CORPORATION, Tokyo (JP)

(72) Inventors: Toshimasa Kobayashi, Tokyo (JP); Marosuke Kikuchi, Tokyo (JP); Yoichi Sato, Tokyo (JP); Yuki Matsuda, Tokyo (JP); Toshimichi Ogisu, Tokyo (JP); Daisuke Hirabayashi, Tokyo (JP); Kei Suzuki, Tokyo (JP); Toru Onishi, Tokyo (JP); Haruka Miyanishi, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 1129 days.

(21) Appl. No.: 16/209,743

(22) Filed: Dec. 4, 2018

(65) Prior Publication Data
US 2019/0236472 A1   Aug. 1, 2019

(30) Foreign Application Priority Data
Jan. 31, 2018 (JP) .................. 2018-015474

(51) Int. Cl.
*G06N 7/00* (2023.01)
*B64F 5/10* (2017.01)
(Continued)

(52) U.S. Cl.
CPC ............ *G06N 7/00* (2013.01); *B64F 5/10* (2017.01); *G05B 19/41805* (2013.01);
(Continued)

(58) Field of Classification Search
CPC .. G06N 7/00; G06N 20/00; B64F 5/10; G05B 19/41805; G05B 2219/45071; G06F 17/11; Y02P 90/02
See application file for complete search history.

(56) References Cited

U.S. PATENT DOCUMENTS

| 5,095,638 A | * | 3/1992 | David | G01B 7/06 702/170 |
| 2002/0059049 A1 | * | 5/2002 | Bradbury | G16H 40/67 703/11 |

(Continued)

FOREIGN PATENT DOCUMENTS

| EP | 3244329 A2 * | 11/2017 | ............... B64C 3/26 |
| JP | 5931458 B | 8/2013 | |

(Continued)

OTHER PUBLICATIONS

Japanese Office Action for Application No. 2018-015474 issued Aug. 6, 2019.
(Continued)

*Primary Examiner* — Cesar B Paula
*Assistant Examiner* — John M Heffington
(74) *Attorney, Agent, or Firm* — TROUTMAN PEPPER HAMILTON SANDERS LLP (57) ABSTRACT

A manufacturing assistance apparatus includes a learning unit and an estimator. The learning unit is configured to load a plurality of pieces of actual measurement data in each of which a gap and a plurality of parameters are associated with each other, and construct an estimation model on the basis of machine learning in which the plurality of pieces of actual measurement data serve as teacher data. The gap is provided between a first workpiece and a second workpiece that eventually structure an airframe of an aircraft and that are eventually fastened to each other. The estimation model estimates the gap from the plurality of parameters. The (Continued)

estimator is configured to derive an estimation value of a length of the gap on which measurement has not yet been performed, on the basis of the estimation model constructed by the learning unit and the plurality of parameters.

10 Claims, 6 Drawing Sheets

(51) Int. Cl.
    *G05B 19/418*     (2006.01)
    *G06F 17/11*     (2006.01)
    *G06N 20/00*     (2019.01)

(52) U.S. Cl.
    CPC ............. *G06F 17/11* (2013.01); *G06N 20/00* (2019.01); *G05B 2219/45071* (2013.01)

(56) References Cited

U.S. PATENT DOCUMENTS

2009/0319454 A1* 12/2009 Regli .................... G06V 10/40
                                              706/13
2013/0186552 A1   7/2013  Asahara et al.
2015/0276376 A1* 10/2015  Lagally ................. G01B 11/14
                                              356/621
2017/0138385 A1*  5/2017  Clark ...................... G06F 30/15
2017/0327201 A1  11/2017  Doyle et al.

FOREIGN PATENT DOCUMENTS

JP        2017-094403 A    6/2017
WO      2007/034197 A1   3/2007

OTHER PUBLICATIONS

Extended European Search Report issued in European Patent Application No. 18 20 7613 dated Jun. 13, 2019.
Manohar, K., et al. "Predicting shim gaps in aircraft assembly with machine learning and sparse sensing" arvix.org, Cornell University Library, 201 Olin Library Cornell University Ithaca, NY 14853. pp. 1-13 (Nov. 27, 2017), XP080839834 cited in EESR issued in EP Appln. No. 18 20 7613 dated Jun. 13, 2019.

* cited by examiner

MANUFACTURING ASSISTANCE APPARATUS

CROSS-REFERENCE TO RELATED APPLICATIONS

The present application claims priority from Japanese Patent Application No. 2018-015474 filed on Jan. 31, 2018, the entire contents of which are hereby incorporated by reference.

BACKGROUND

The technology relates to a manufacturing assistance apparatus that assists manufacturing of an airframe of an aircraft.

Manufacturing an aircraft involves operations including fastening a first workpiece and a second workpiece. The first workpiece and the second workpiece are fastened by a fastener that penetrates the first workpiece and the second workpiece. For example, reference is made to Japanese Patent No. 5931458.

SUMMARY

An aspect of the technology provides a manufacturing assistance apparatus that includes: a learning unit configured to load a plurality of pieces of actual measurement data in each of which a gap and a plurality of parameters are associated with each other, and construct an estimation model on the basis of machine learning in which the plurality of pieces of actual measurement data serve as teacher data, in which the gap is provided between a first workpiece and a second workpiece that eventually structure an airframe of an aircraft and that are eventually fastened to each other, and the estimation model estimates the gap from the plurality of parameters; and an estimator configured to derive an estimation value of a length of the gap on which measurement has not yet been performed, on the basis of the estimation model constructed by the learning unit and the plurality of parameters.

An aspect of the technology provides a manufacturing assistance apparatus that includes circuitry configured to load a plurality of pieces of actual measurement data in each of which a gap and a plurality of parameters are associated with each other, in which the gap is provided between a first workpiece and a second workpiece that eventually structure an airframe of an aircraft and that are eventually fastened to each other, construct an estimation model on the basis of machine learning in which the plurality of pieces of actual measurement data serve as teacher data, in which the estimation model estimates the gap from the plurality of parameters, and derive an estimation value of a length of the gap on which measurement has not yet been performed, on the basis of the constructed estimation model and the plurality of parameters.

DETAILED DESCRIPTION

In the following, some implementations of the technology are described in detail with reference to the accompanying drawings. Note that sizes, materials, specific values, and any other factors illustrated in respective implementations are illustrative for easier understanding of the technology, and are not intended to limit the scope of the technology unless otherwise specifically stated. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. Further, elements that are not directly related to the technology are unillustrated in the drawings.

Figure 1:
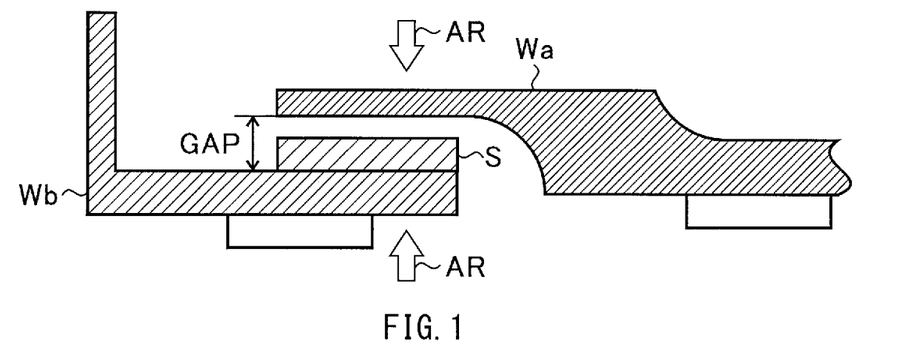
FIG. 1 is a diagram illustrating an example of an operation process performed on a first workpiece and a second workpiece.

FIG. 1 is a diagram illustrating an example of an operation process performed on a first workpiece Wa and a second workpiece Wb, and illustrating cross-sections of the first workpiece Wa, the second workpiece Wb, and a shim S. The first workpiece Wa and the second workpiece Wb eventually structure an airframe of an aircraft. The first workpiece Wa and the second workpiece Wb each may serve as a work object. The first workpiece Wa and the second workpiece Wb may be pressed by an unillustrated fastener in directions in which the first and the second workpieces Wa and Wb are brought close to each other (denoted by arrows AR in FIG. 1) and thus fastened by the fastener. The fastener can be a bolt or any other fastening member.

Referring to FIG. 1, when the first workpiece Wa and the second workpiece Wb are attached together, a gap GAP may possibly be formed in a vertical direction in FIG. 1. Under such circumstances, tightening the first workpiece Wa and the second workpiece Wb by means of the fastener can eliminate the gap GAP. On the other hand, this may possibly result in deformation of the first workpiece Wa, the second workpiece Wb, or both, raising a concern of internal stress generated in the first workpiece Wa and the second workpiece Wb, especially in the field of aircrafts. Accordingly, a tolerance, such as an allowable width or an allowable range, set for a length or a size of the gap GAP formed between the first workpiece Wa and the second workpiece Wb may sometimes be small in the field of aircrafts. In other words, a ratio in magnitude of the tolerance to a dimension tolerance of the first workpiece Wa, the second workpiece Wb, or both may possibly be smaller than that in any field other than the field of aircrafts. Hence, any error may often cause the length of the gap GAP to fall outside the tolerance.

To suppress the internal stress of the first workpiece Wa and the second workpiece Wb, one measure may be to insert the shim S between the first workpiece Wa and the second workpiece Wb. In this case, the fastener may so fasten the first workpiece Wa and the second workpiece Wb as to penetrate the first workpiece Wa, the shim S, and the second workpiece Wb, for example. Under such circumstances, use of the shim S becomes necessary or unnecessary depending on the length of the gap GAP. This means that an operation of measuring the gap GAP is required each time for each combination of the first workpiece Wa and the second workpiece Wb, leading to an increase in operation man-hour.

It is desirable to provide a manufacturing assistance apparatus that makes it possible to reduce operation man-hour.

Figure 2:
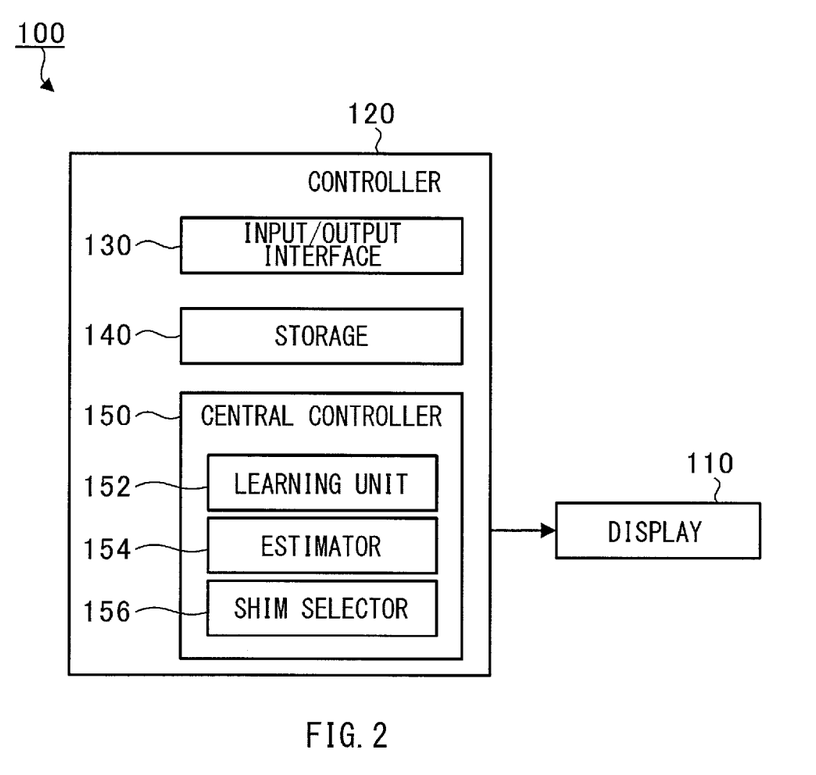
FIG. 2 is a block diagram illustrating an example of a configuration of a manufacturing assistance apparatus according to one implementation of the technology.

FIG. 2 is a block diagram illustrating an example of a configuration of a manufacturing assistance apparatus 100 according to an example implementation of the technology, in which a solid arrow denotes a flow of data. The manufacturing assistance apparatus 100 may include a display 110 and a controller 120.

The display 110 may display an image in accordance with a control performed by the controller 120. Non-limiting examples of the display 110 may include a liquid crystal display and an organic electroluminescence (EL) display.

The controller 120 may be a personal computer, for example. The controller 120 may include an input/output interface 130, a storage 140, and a central controller 150. Note that the controller 120 is not limited to the personal computer. For example, the controller 120 may be a dedicated device or any computable device in an alternative example implementation.

The input/output interface 130 may be one or more of devices including a mouse, a keyboard, and a touch sensor, for example. The input/output interface 130 may accept an input operation performed by a user, and transmit, to the central controller 150, information on the input operation. The input/output interface 130 may communicate with a storage terminal such as a portable universal serial bus (USB) flash drive. The input/output interface 130 may communicate with an external device, instead of or in addition to the communication with the storage terminal.

The storage 140 may be any storage including a hard disk drive (HDD), for example. The storage 140 may contain a plurality of pieces of actual measurement data in each of which the gap GAP, measured for a set of the first workpiece Wa and the second workpiece Wb, and a plurality of parameters are associated with each other. The plurality of parameters are those that influence the gap GAP, and are described later in greater detail.

The actual measurement data may be obtained through the input/output interface 130. For example, the actual measurement data may be obtained through: an input operation performed by an operator by means of the keyboard or any other operating device; a direct input from any measuring instrument; an input from the storage terminal; or an input from the external device by means of the communication.

The central controller 150 may be a microcomputer, and may control, in an overall fashion, the controller 120 as a whole. The microcomputer may have devices including a central processing unit (CPU), a read-only memory (ROM) in which pieces of information including a program are stored, and a random-access memory (RAM) that serves as a work area.

The central controller 150 may execute the program to serve as a learning unit 152, an estimator 154, and a shim selector 156. In one implementation, the central controller 150 may serve as one or more of a "learning unit", an "estimator", and a "shim selector". The learning unit 152 may load the plurality of pieces of actual measurement data into the work area. Further, the learning unit 152 constructs an estimation model, on the basis of machine learning in which the plurality of pieces of actual measurement data serve as teacher data. The estimation model estimates the gap GAP from the plurality of parameters. Note that the machine learning performs repetitive learning from pieces of data and finds out a pattern laid behind the pieces of data. In other words, in an example implementation, the learning unit 152 may construct the estimation model on the basis of a so-called artificial intelligence technique.

Figure 3:
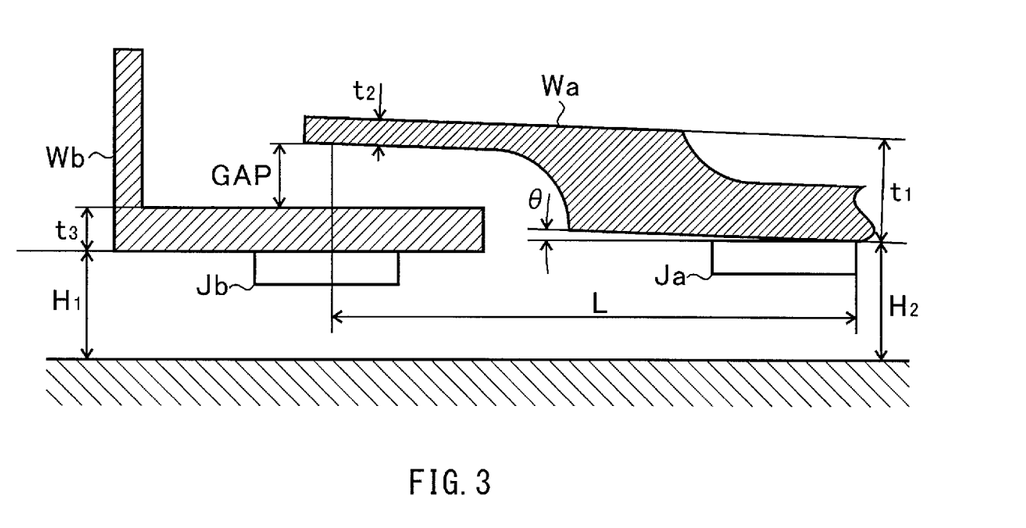
FIG. 3 is a diagram illustrating an example of a process performed by a learning unit illustrated in FIG. 2.

FIG. 3 is a diagram illustrating an example of a process performed by the learning unit 152. The plurality of parameters influence the gap GAP provided between the first workpiece Wa and the second workpiece Wb. FIG. 3 illustrates an example in which the first workpiece Wa and the second workpiece Wb are respectively supported roughly horizontally by a jig Ja and a jig Jb.

Non-limiting examples of the parameters for the first workpiece Wa may include: a thickness $t_1$ of a part of the first workpiece Wa which is supported by the jig Ja; a thickness $t_2$ of a part of the first workpiece Wa which is to be fastened to the second workpiece Wb; a tilt θ of the first workpiece Wa to a horizontal plane; and a height $H_2$ of a contact surface of the jig Ja which comes into contact with the first workpiece Wa. Non-limiting examples of the parameters for the second workpiece Wb may include: a thickness $t_3$ of a part of the second workpiece Wb which is to be fastened to the first workpiece Wa; and a height $H_1$ of a contact surface of the jig Jb which comes into contact with the second workpiece Wb. For example, the gap GAP may be expressed by the following expression (1):

$$GAP=(H_2-H_1)+t_1+L*\sin θ-t_2-t_3 \qquad (1)$$

where L is a length from a contact position, at which the first workpiece Wa and the jig Ja comes into contact with each other, to a fastening position at which the first workpiece Wa and the second workpiece Wb are fastened.

Note that the plurality of parameters described previously are merely illustrative and non-limiting. There can be countless patterns for the plurality of parameters depending on shapes, materials, and/or other factors of the first workpiece Wa, the second workpiece Wb, the jig Ja, and the jig Jb.

Some other non-limiting examples of the parameters may include, where a fastening part belonging to other workpieces is present near the first and the second workpieces Wa and Wb: a length of the gap GAP thereof; a thickness of the shim S; and fastening force, i.e., fit up force. Yet some other non-limiting examples of the parameters may include: positions of the jigs Ja and Jb; and positions, fit up force, and/or corrective (i.e., deformation) amounts upon pressing the first and the second workpieces Wa and Wb respectively against the jigs Ja and Jb. Note that the first workpiece Wa, the second workpiece Wb, or both may be an assembly instead of a single component part. In such a case, the parameters may include parameters related to shapes (such as a thickness, a flange angle, a twist, or waviness) of respective component parts structuring the first workpiece Wa, the second workpiece Wb, or both. In a case where a measurement jig is used for measurement of a dimension of each component part, the parameters may include fit up force upon pressing each of the component parts against the measurement jig.

Non-limiting examples of the parameters may also include: an order and/or fastening torque both upon fastening the fastener; a position at which a tolerance measurement is performed and/or a tolerance measurement value both after assembling, such as after the fastening of the first and the second workpieces Wa and Wb; a temperature; a humidity; and information related to manipulation of a device used for assembling.

The plurality of parameters, such as those described above, and the gap GAP are associated with each other in the actual measurement data. The plurality of parameters are measured for or derived from a set of the first workpiece Wa and the second workpiece Wb. The learning unit 152 constructs the estimation model that estimates the gap GAP from the plurality of parameters, on the basis of the machine learning in which the plurality of pieces of actual measurement data serve as the teacher data.

The learning unit 152, when receiving new actual measurement data, may add the new actual measurement data to the teacher data and execute, as needed, the machine learning to thereby reconstruct the estimation model. The thus-constructed latest estimation model may be stored in the storage 140.

The estimator 154 derives an estimation value of a length of the gap GAP on which measurement has not yet been performed, on the basis of the estimation model stored in the storage 140 and the plurality of parameters. For example, when an accuracy of the estimation model becomes sufficient, the operator may stop measuring the gap GAP for a subsequent set of the first workpiece Wa and the second workpiece Wb. Note that the input/output interface 130 may receive an input of only the plurality of parameters.

The estimator 154 may apply, to the estimation model, the plurality of parameters that are inputted through the input/output interface 130 to thereby derive the estimation value of the length of the gap GAP. Thus, using the manufacturing assistance apparatus 100 having the foregoing example configuration eliminates the necessity of executing a measurement process performed on the gap GAP, making it possible to reduce operation man-hour.

The shim selector 156 may select the shim S to be inserted into the gap GAP, on the basis of the estimation value of the length of the gap GAP. For example, the shim S may be a plurality of previously-prepared standard shims, including a first standard shim, a second standard shim, and a third standard shim.

Figure 4A:
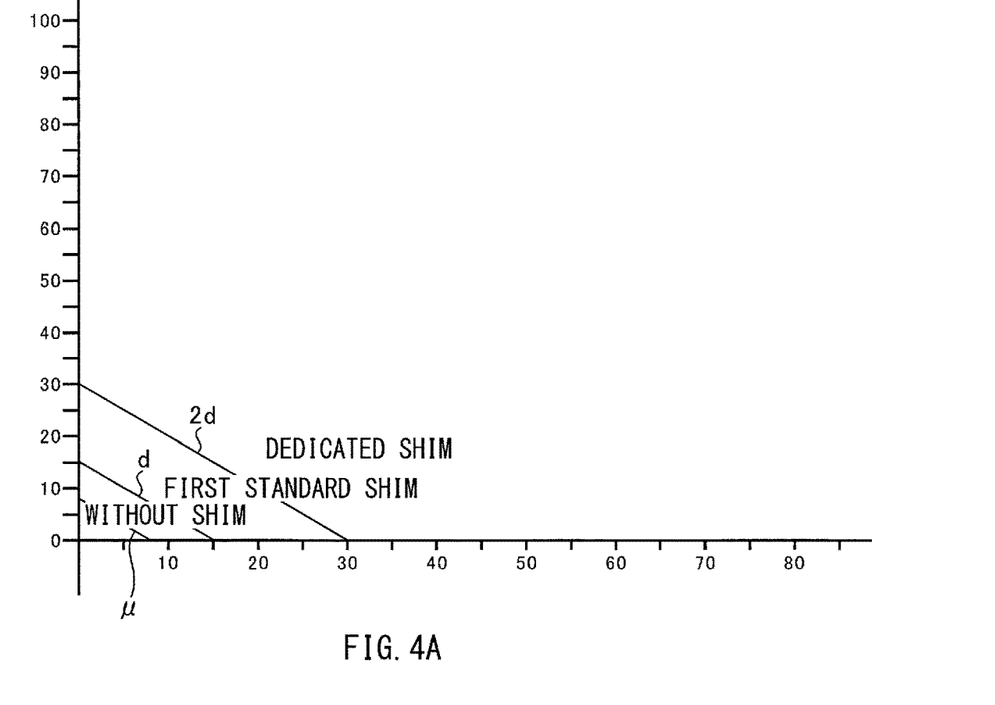
FIG. 4A and FIG. 4B are diagrams for describing standard shims.
Figure 4B:
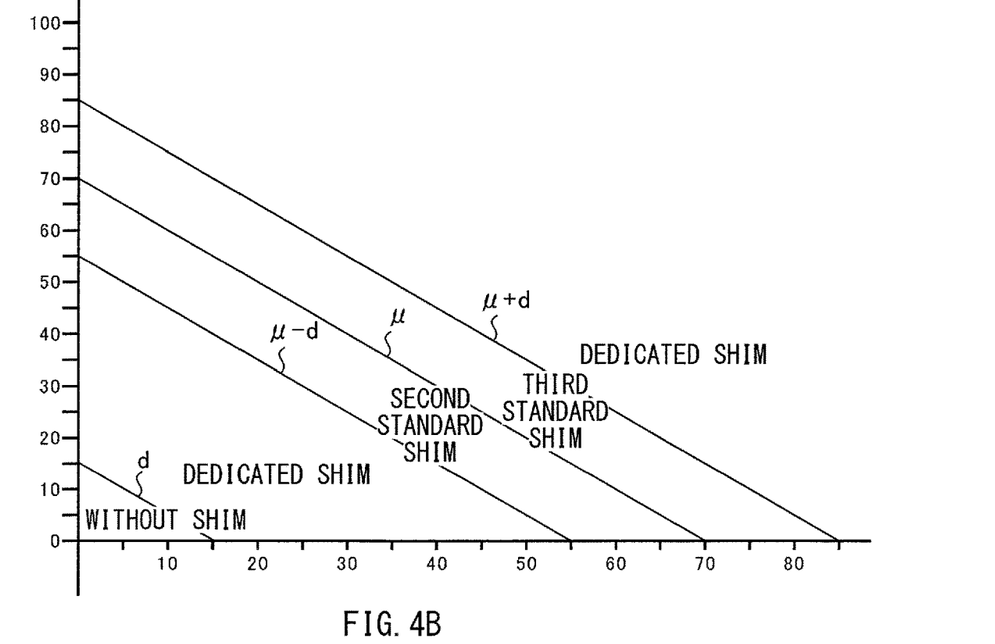

FIG. 4A and FIG. 4B are diagrams for describing the standard shims. FIG. 4A illustrates an example in which median $\mu$ of actual measurement values of the respective gaps GAP is less than a tolerance "d" of the gap GAP, whereas FIG. 4B illustrates an example in which the median $\mu$ is greater than the tolerance d. Note that, in FIGS. 4A and 4B, a vertical axis and a horizontal axis each illustrate a length of the gap GAP, and numerical values of respective scale marks are illustrative and non-limiting. Any one of the examples illustrated in FIGS. 4A and 4B may include a case where the median $\mu$, is equal to the tolerance d. The median $\mu$ may be a representative value of the length of the gap GAP. Alternatively, a mean value may be used instead of the median $\mu$.

Referring to FIG. 4A that illustrates an example where the median $\mu$ of the actual measurement values of the respective gaps GAP is less than the tolerance d of the gap GAP, the use of the shims S may be unnecessary in an example case where the length of the gap GAP is equal to or less than the tolerance d. The first standard shim may be used in an example case where the gap GAP is equal to or greater than the tolerance d and equal to or less than 2d, i.e., equal to or less than a value twice the tolerance d. In such an example case, the first standard shim may fill the gap GAP, allowing a difference between the gap GAP and the first standard shim to be equal to or less than the tolerance d. Further, a dedicated shim that matches with a size of the gap GAP may be newly manufactured in an example case where the gap GAP is greater than 2d, i.e., greater than the value twice the tolerance d.

Assuming that the gap GAP is designed to be equal to or greater than 0 (zero), and that the variation $\sigma$ of the gap GAP is less than the tolerance d ($\sigma<d$) in the actual measurement data when the variation $\sigma$ of the gap GAP and the tolerance d are compared with each other, the expression "$\mu+\sigma<d+\sigma<2d$" holds true, meaning that 1$\sigma$ interval (an interval from −1$\sigma$ to 1$\sigma$) as well as any other interval are covered solely by the first standard shim. In other words, simply preparing the first standard shim makes it possible to manufacture 68.27% or more of the entire products. Similarly, it is possible to manufacture 95.55% or more of the entire products when 2$\sigma<d$ holds true, and to manufacture 99.73% or more of the entire products when 3$\sigma<d$ holds true.

Referring to FIG. 4B that illustrates an example where the median $\mu$ is greater than the tolerance d, the use of the shims S may be unnecessary in an example case where the gap GAP is equal to or less than the tolerance d. The dedicated shim that matches with a size of the gap GAP may be manufactured in an example case where the gap GAP is equal to or greater than the tolerance d and equal to or less than a value in which the tolerance d is subtracted from the median $\mu$.

The second standard shim may be used in an example case where the gap GAP is greater than the value in which the tolerance d is subtracted from the median $\mu$ and equal to or less than the median $\mu$. In such an example case, the second standard shim may fill the gap GAP, allowing a difference between the gap GAP and the second standard shim to be equal to or less than the tolerance d. The third standard shim may be used in an example case where the gap GAP is greater than the median $\mu$ and equal to or less than a value in which the tolerance d is added to the median $\mu$. In such an example case, the third standard shim may fill the gap GAP, allowing a difference between the gap GAP and the third standard shim to be equal to or less than the tolerance d. The dedicated shim that matches with a size of the gap GAP may be used in an example case where the gap GAP is greater than the value in which the tolerance d is added to the median $\mu$.

Assuming that the variation $\sigma$ of the gap GAP is less than the tolerance d ($\sigma<d$) in the actual measurement data when the variation $\sigma$ of the gap GAP and the tolerance d are compared with each other, the expression "$\mu-d<\mu-\sigma<\mu<\mu+\sigma<\mu+d$" holds true, meaning that the 1$\sigma$ interval as well as any other interval are covered by the second standard shim and the third standard shim. In other words, simply preparing the two kinds of shims S makes it possible to manufacture 68.27% or more of the entire products. Similarly, it is possible to manufacture 95.55% or more of the entire products when 2$\sigma<d$ holds true, and to manufacture 99.73% or more of the entire products when 3$\sigma<d$ holds true.

As described above, use of the shims S thus becomes unnecessary at a rate of about half or more of the entire products upon manufacturing when the median $\mu$ is less than the tolerance d ($\mu<d$). Hence, in this case, preparing only one kind of shim S suffices. Note that, when the median µ is greater than the tolerance d (µ>d), sometimes the tolerance d may possibly be extremely large with respect to the median µ. In this case, the two kinds of shims S may be used that have their respective thicknesses that are based on the median µ as a reference. As can be appreciated from these cases, it is therefore possible to keep the rate of fabricating the dedicated shim lower, and thereby to reduce operation man-hour.

The shim selector 156 may derive, from the actual measurement data, the median µ of the lengths of the respective gaps GAP, and may perform classification of situations on the basis of a comparison between the median µ and the tolerance d. For example, if any standard shim is available for the estimation value of the gap GAP, the shim selector 156 may select that standard shim. The shim selector 156 may cause the display 110 to display a type of the selected standard shim. Alternatively, the shim selector 156 may output, to the external device through the input/output interface 130, information on the type of the selected standard shim, instead of causing the display 110 to display the type of the selected standard shim.

If no standard shim is available for the estimation value of the gap GAP, the shim selector 156 may cause the display 110 to display the estimation value of the gap GAP and a message notifying that no standard shim is available. Alternatively, the shim selector 156 may output, to the external device through the input/output interface 130, the estimation value of the gap GAP and the message, instead of causing the display 110 to display them.

Figure 5:
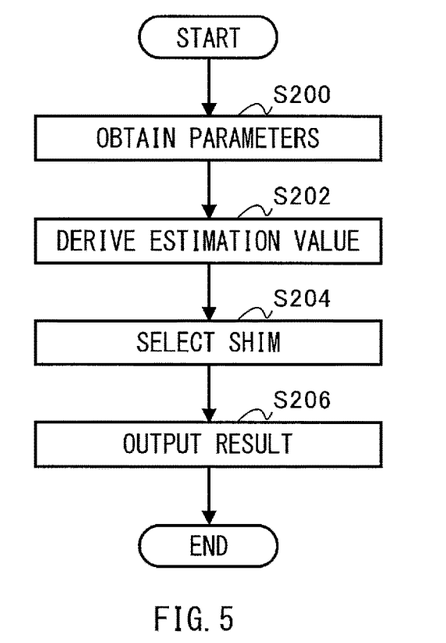
FIG. 5 is a flowchart illustrating an example of a process flow in a manufacturing assistance method to be performed by a central controller illustrated in FIG. 2.

FIG. 5 is a flowchart illustrating an example of a flow of a process in a manufacturing assistance method to be performed by the central controller 150. For example, the process illustrated by way of example in FIG. 5 may be executed for each combination of the first workpiece Wa and the second workpiece Wb. Note that FIG. 5 illustrates an example in which the learning unit 152 has already performed the machine learning.

[Step S200]

At step S200, the estimator 154 may obtain the plurality of parameters. For example, the estimator 154 may obtain the plurality of parameters through the input/output interface 130.

[Step S202]

At step S202, the estimator 154 may derive the estimation value of the length of the gap GAP. For example, the estimator 154 may derive the estimation value through applying the plurality of parameters to the estimation model read from the storage 140.

[Step S204]

At step S204, the shim selector 156 may select the shim S to be inserted into the gap GAP. For example, the shim selector 156 may select the shim S on the basis of the estimation value of the length of the gap GAP.

[Step S206]

At step S206, the shim selector 156 may output a result. For example, the shim selector 156 may cause the display 110 to display a type of the selected standard shim. If there is no standard shim available for the estimation value of the gap GAP, the shim selector 156 may cause the display 110 to display the estimation value of the gap GAP and a message notifying that no standard shim is available.

Figure 6:
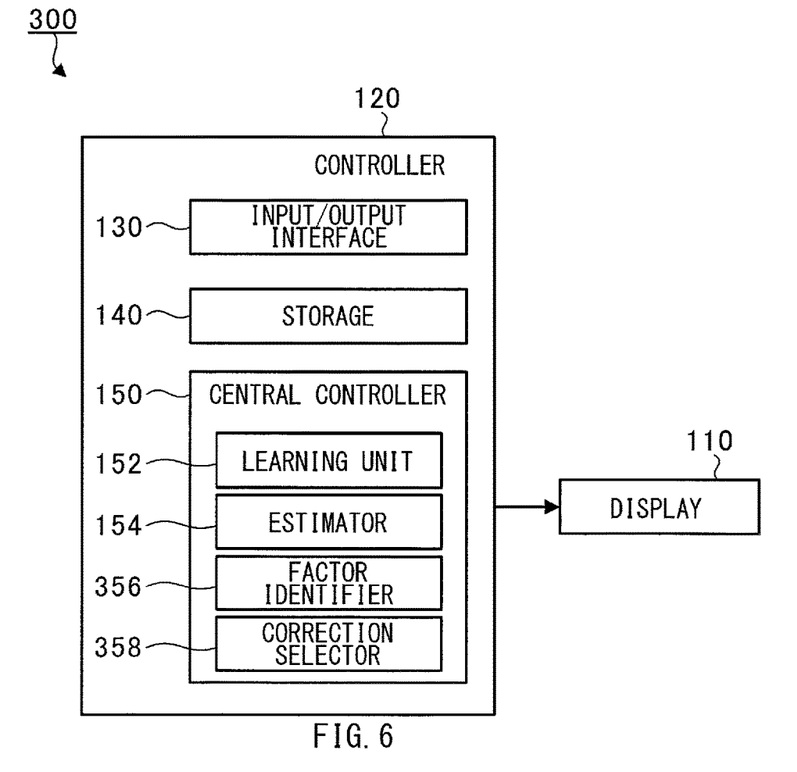
FIG. 6 is a block diagram illustrating an example of a configuration of a manufacturing assistance apparatus according to a first modification example.

FIG. 6 is a block diagram illustrating an example of a configuration of a manufacturing assistance apparatus 300 according to a first modification example. Referring to FIG. 6, the manufacturing assistance apparatus 300 may include, instead of the shim selector 156, a factor identifier 356 and a correction selector 358. The central controller 150 may execute the program to serve as the factor identifier 356 and the correction selector 358, in addition to the learning unit 152 and the estimator 154. In one implementation, the central controller 150 may serve as one or both of a "factor identifier" and a "correction selector".

The factor identifier 356 may supply test data related to the plurality of parameters, and may identify any parameter having a large influence on the length of the gap GAP. For example, the factor identifier 356 may select one of the plurality of parameters. Further, for a numerical value of the selected parameter, the factor identifier 356 may extract a value that is biased in the actual measurement data, and may set the extracted biased value to the selected parameter. For a numerical value of any remaining parameter, the factor identifier 356 may extract a value that is average in the actual measurement data, and may set the extracted average value to that remaining parameter.

The factor identifier 356 may generate a plurality of pieces of test data through sequentially changing, out of the plurality of parameters, the parameters to each of which the biased value is set. The number of parameters to which the biased value is set may be one, or may be two or more. Note that the average value may be set for the numerical value of any remaining parameter that is other than the parameter to which the biased value is set.

The factor identifier 356 may thus generate the test data in which the numerical values are set to the plurality of parameters. The factor identifier 356 may output the test data to the estimator 154. The estimator 154 may apply the test data to the estimation model to thereby derive the estimation value of the length of the gap GAP.

The factor identifier 356 may analyze an influence (or a degree of contribution) on the estimation value of the length of the gap GAP which is exerted when the numerical value of any parameter is varied. The factor identifier 356 may perform the analysis on the basis of the obtained estimation value of the length of the gap GAP and the test data. Note that a numerical value may be weighted for each parameter. Specifically, the value of the tilt θ and the value of the length L differ from each other in unit, in which case even the difference by the numerical value of "1" has completely-different meaning. Hence, when deriving a numerical value as the degree of contribution, the factor identifier 356 may perform multiplication of the numerical value by a weighting coefficient that is set for each parameter to thereby perform correction or normalization of the numerical value.

The factor identifier 356 may identify, with respect to the plurality of parameters, an order of magnitude of the influence exerted on the estimation value of the length of the gap GAP. The factor identifier 356 may thus identify any parameter having the large influence on the length of the gap GAP.

The correction selector 358 may select a correction procedure with respect to the parameter identified by the factor identifier 356, when the estimation value of the length of the gap GAP falls outside an application range in which any of the above-described standard shims is available. The correction procedure may allow the length of the gap GAP to be closer to the application range. A description is now given, with reference to FIG. 7, of an example of a process to be performed by the correction selector 358.

Figure 7:
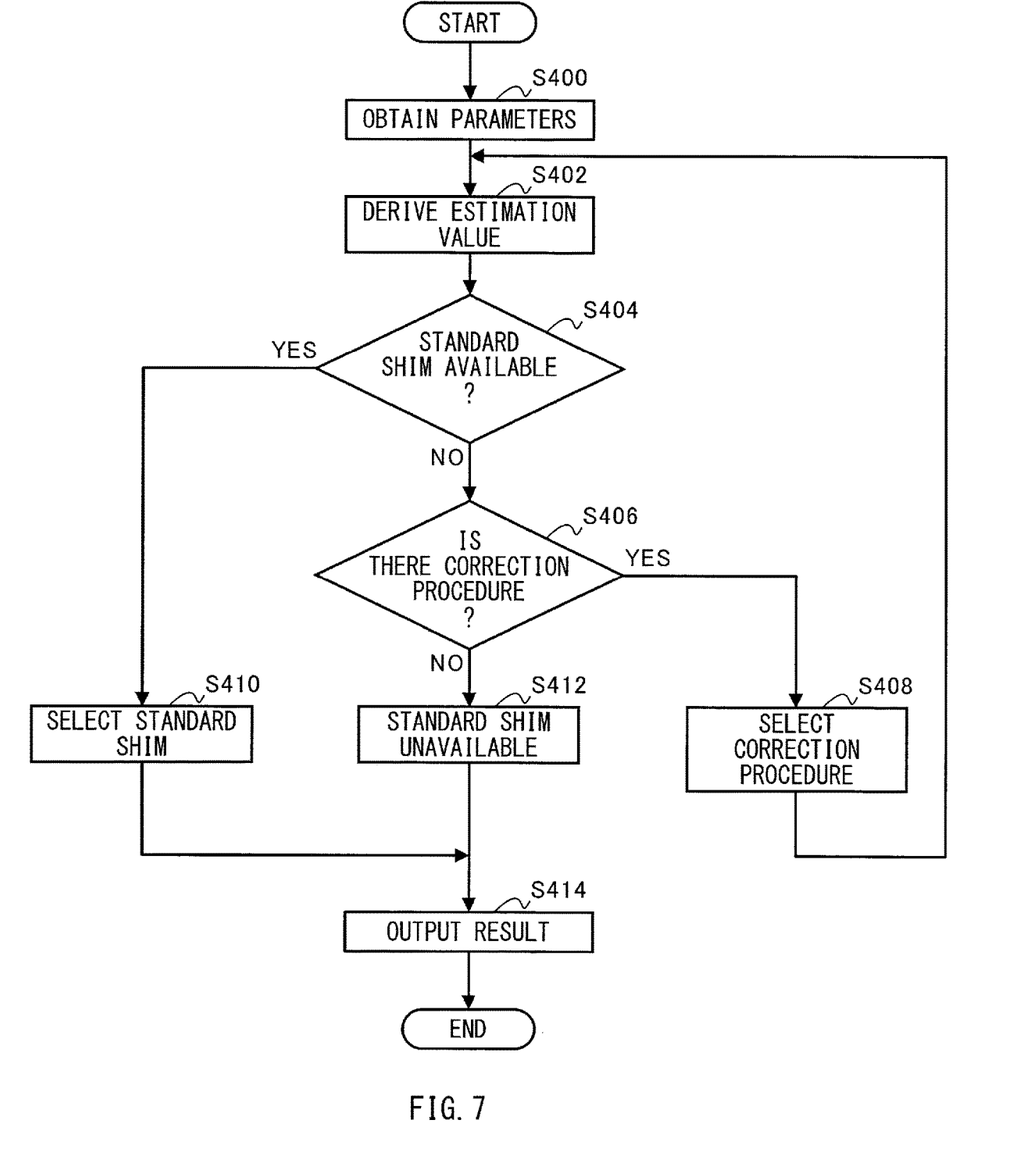
FIG. 7 is a flowchart illustrating an example of a process flow in a manufacturing assistance method to be performed by the central controller illustrated in FIG. 6 according to the first modification example.

FIG. 7 is a flowchart illustrating an example of a flow of a process in a manufacturing assistance method to be performed by the central controller 150 according to the first modification example. For example, the process illustrated by way of example in FIG. 7 may be executed for each combination of the first workpiece Wa and the second workpiece Wb. Note that FIG. 7 illustrates an example in which the learning unit 152 has already performed the machine learning and the factor identifier 356 has already performed the foregoing example process.

[Step S400]

At step S400, the estimator 154 may obtain the plurality of parameters. For example, the estimator 154 may obtain the plurality of parameters through the input/output interface 130.

[Step S402]

At step S402, the estimator 154 may derive the estimation value of the length of the gap GAP. For example, the estimator 154 may derive the estimation value through applying the plurality of parameters to the estimation model read from the storage 140. Note that, if the correction procedure is selected at later-described step S408, the estimator 154 may assume that the selected correction procedure has been executed.

Further, the estimator 154 may derive the estimation value of the length of the gap GAP after the value of any parameter is corrected as appropriate in accordance with the correction procedure. Note that, when the process at step S408 is executed plural times and the plurality of correction procedures are selected accordingly, the value of any parameter may be corrected in accordance with each of such correction procedures.

[Step S404]

At step S404, the correction selector 358 may determine whether any of the standard shims is available. For example, the correction selector 358 may determine whether the estimation value of the length of the gap GAP falls within the application range in which any of the standard shims is available. The process may proceed to step S410 if any of the standard shims is available, e.g., if the estimation value falls within the application range (step S404: YES). The process may proceed to step S406 if none of the standard shims are available, e.g., if the estimation value does not fall within the application range (step S404: NO).

[Step S406]

When none of the standard shims are available (step S404: NO), at step S406, the correction selector 358 may determine whether there is an applicable correction procedure. The correction procedure may allow the length of the gap GAP to be closer to the application range. For example, the operator may input, in advance, examples of correction procedures that are executable as the correction procedures into the manufacturing assistance apparatus 300 through the input/output interface 130. The thus-inputted examples of correction procedures serving as candidates of the executable correction procedures may be stored in the storage 140.

Non-limiting examples of the correction procedure may include: replacing a related component part with a related component part that is to be used for any other airframe or for any other numbered aircraft; performing additional processing on the related component part; changing positions of the jig Ja, the jig Jb, or both; and changing a temperature. The related component part may be one or more of the first workpiece Wa, the second workpiece Wb, the jig Ja, and the jig Jb, or may be a component part related to one or more of them. The additional processing may be cutting, machining, correction, or any other processing applicable to the related component part. As a result of executing the correction procedure, the influence exerted on the plurality of parameters (i.e., a correction value) may be associated to the correction procedure.

The correction selector 358 may determine whether there is an applicable correction procedure not yet selected. The process may proceed to step S408 if there is still an applicable correction procedure (step S406: YES). The process may proceed to step S412 if there is no applicable correction procedure (step S406: NO).

[Step S408]

When there is an applicable correction procedure (step S406: YES), at step S408, the correction selector 358 may select the correction procedure. For example, the correction selector 358 may select, out of the applicable correction procedures, the correction procedure that is related to the parameter having the largest influence on the length of the gap GAP, on the basis of the order of the magnitude identified by the factor identifier 356.

[Step S410]

When any of the standard shims is available (step S404: YES), at step S410, the correction selector 358 may select any of the standard shims as the shim S to be inserted into the gap GAP, as with the shim selector 156 described above.

[Step S412]

When there is no applicable correction procedure (step S406: NO), at step S412, the correction selector 358 may determine that the use of the standard shims is difficult or not possible, and may select the dedicated shim as the shim S to be inserted into the gap GAP, as with the shim selector 156 described above.

[Step S414]

After making a transition from step S410 or step S412, at step S414, the correction selector 358 may output a result. For example, the correction selector 358 may cause the display 110 to display a type of the selected standard shim if the standard shim has been selected. Here, the correction selector 358 may cause the display 110 to display the selected correction procedure as well if the correction procedure has been selected. In contrast, if there is no standard shim available for the estimation value of the gap GAP, the correction selector 358 may cause the display 110 to display the estimation value of the gap GAP and the message notifying that no standard shim is available.

Accordingly, owing to the correction procedure, the foregoing first modification example makes it possible to improve a use rate of the standard shims. In addition, the first modification example makes it possible to execute, on a priority basis, the correction procedure related to the parameter having the large influence on the length of the gap GAP, which in turn makes it difficult for a less-effective correction procedure to be executed. Further, the first modification example allows for checking of effectiveness before actually performing the correction procedure, making it possible to improve an operation efficiency.

Figure 8:
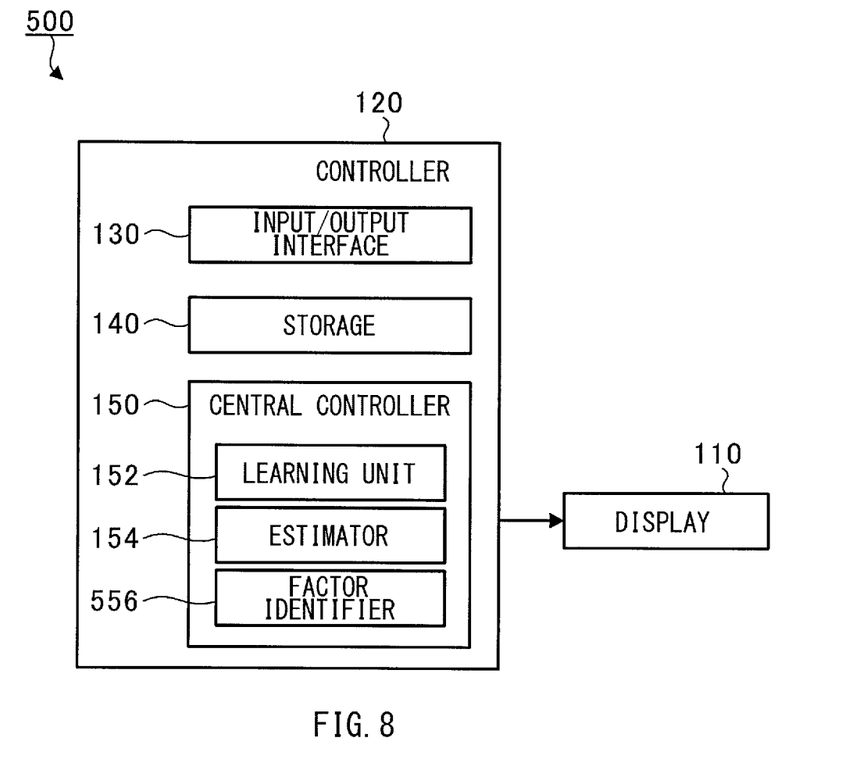
FIG. 8 is a block diagram illustrating an example of a configuration of a manufacturing assistance apparatus according to a second modification example.

FIG. 8 is a block diagram illustrating an example of a configuration of a manufacturing assistance apparatus 500 according to a second modification example. Referring to FIG. 8, the manufacturing assistance apparatus 500 differs from the manufacturing assistance apparatus 300 according to the first modification example, in that the manufacturing assistance apparatus 500 includes no correction selector 358 and includes a factor identifier 556 that performs a process different from the process performed by the factor identifier 356. The central controller 150 may execute the program to serve as the learning unit 152, the estimator 154, and the factor identifier 556. In one implementation, the central controller 150 may serve the "factor identifier".

The factor identifier 556 may identify, with respect to the plurality of parameters, the order of magnitude of the influence exerted on the estimation value of the length of the gap GAP, as with the factor identifier 356. Further, the factor identifier 556 may cause the display 110 to display the identified order of the parameters.

Figure 9:
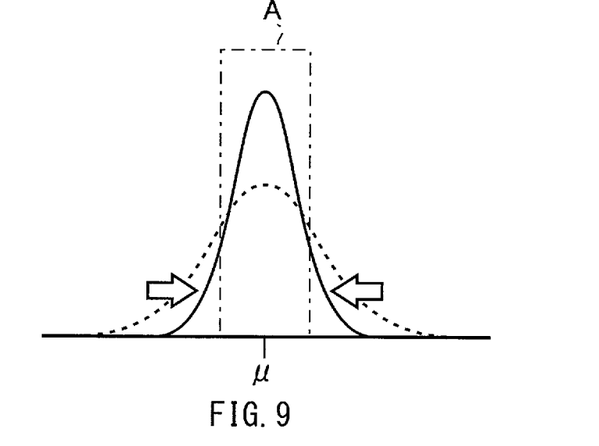
FIG. 9 is a diagram for describing an example of suppression of a variation in length of a gap.

FIG. 9 is a diagram for describing an example of suppression of a variation in length of the gap GAP. Referring to FIG. 9, as can be appreciated from a broken line, a rate in which the length of the gap GAP falls outside an application range A increases when the variation in length of the gap GAP is large. The application range A is a range in which any of the standard shims is available. In contrast, as can be appreciated from a solid line of FIG. 9, a rate in which the length of the gap GAP falls within the application range A increases when the variation in length of the gap GAP is suppressed.

In view of such suppression of the variation, the factor identifier 556 may display the order of the parameters on the display 110. This allows the operator to perform, for example, a design change in descending order of the influence on the length of the gap GAP. For example, the design change may include narrowing down a tolerance of any parameter. Accordingly, the variation in length of the gap GAP is suppressed, making it possible to improve the use rate of the standard shims. The second modification example also makes it possible to execute, on a priority basis, the design change related to the parameter having the large influence on the length of the gap GAP, which in turn makes it difficult for a less-effective design change to be executed.

Although some implementations of the technology have been described in the foregoing by way of example with reference to the accompanying drawings, the technology is by no means limited to the implementations described above.

For example, the factor identifier 356 in the foregoing first modification example may identify the order of magnitude of the influence exerted on the estimation value of the length of the gap GAP with respect to the plurality of parameters. However, if the plurality of parameters (not necessarily all of the parameters) are varied together and where, in such a case, the influence on the estimation value of the length of the gap GAP becomes large due to a synergistic effect, the factor identifier 356 in an alternative example implementation may identify the order of magnitude in consideration of a combination of such plurality of parameters as well. In such an alternative example implementation, the correction selector 358 may select, out of the applicable correction procedures, the correction procedure that is related to the parameter or a combination of the parameters which has the largest influence on the length of the gap GAP, on the basis of the order of parameters and of combinations of the parameters.

The factor identifier 556 in the foregoing second modification example may cause the display 110 to display the order of magnitude of the influence exerted on the estimation value of the length of the gap GAP. However, if the plurality of parameters (not necessarily all of the parameters) are varied together and where, in such a case, the influence on the estimation value of the length of the gap GAP becomes large due to a synergistic effect, the factor identifier 556 in an alternative example implementation may cause the display 110 to display a combination of such plurality of parameters as well. In other words, in such an alternative example implementation, the factor identifier 556 may cause the display 110 to display, including combinations of such plurality of parameters as well, the order of parameters and of the combinations of the parameters.

The factor identifiers 356 and 556 each may identify the order of magnitude of the influence exerted on the estimation value of the length of the gap GAP with respect to the plurality of parameters. However, it is sufficient for each of the factor identifiers 356 and 556 to identify any parameter that has the larger influence on the gap GAP than at least another one of the parameters.

The correction selector 358 in the foregoing first modification example may select the correction procedures on the basis of the order of the parameters identified by the factor identifier 356. The factor identifier 356, however, is not necessarily an essential feature. In an alternative example implementation, the correction selector 358 may select the correction procedures in any order.

The central controller 150 illustrated in FIGS. 2, 6, and 8 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the central controller 150. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the central controller 150 illustrated in FIGS. 2, 6, and 8.

It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A manufacturing assistance apparatus comprising at least one machine readable medium storing instructions and at least one processor configured to execute the instructions to:
   load pieces of actual measurement data in each of which a gap and parameters are associated with each other;
   construct a trained estimation model on a basis of machine learning in which the pieces of actual measurement data serve as teacher data, the gap being provided between a first workpiece and a second workpiece that eventually structure an airframe of an aircraft and that are eventually fastened to each other;
   input the parameters into a trained latest estimation model to derive an estimation value of a length of the gap on which measurement has not yet been performed, wherein the trained latest estimation model is trained by inputting the teacher data comprising latest actual measurement data into the constructed trained estimation model to execute the constructed trained estimation model;
   select, when determining that the estimation value of the length of the gap falls within an application range, a first standard shim from among predetermined standard shims;
   identify an order of magnitude of influence by the parameters exerted on the estimation value of the length of the gap based on test data that is related to the parameters;

select a correction procedure and a second standard shim from among the predetermined standard shims, based on determining that (i) the estimation value of the length of the gap falls outside the application range, (ii) there is a selectable correction procedure from predetermined correction procedures to allow the gap to be closer to the application range, and (iii) the correction procedure has a largest magnitude of influence among the correction procedures and is selected based on the order of the magnitude of the influence by the parameters, each of the predetermined correction procedures being associated with one or more correction values for the parameters and stored in a storage, wherein the correction procedures correct the parameters to generate corrected input for the trained latest estimation model;

select, a dedicated shim different from the predetermined standard shims, based on determining that (i) the estimation value of the length of the gap falls outside the application range and (ii) there is no correction procedure selectable from the predetermined correction procedures to allow the gap to be closer to the application range;

update, in response to selecting the correction procedure, the corrected parameters into updated parameters corresponding to the selected correction procedure based on the one or more correction values, wherein the predetermined correction procedures include replacing a related component part, performing a machining process on the related component part, changing positions of a first jig for the first workpiece or a second jig for the second workpiece, or changing a temperature around the related component part, the related component part is the first workpiece, the second workpiece, the first jig for the first workpiece, or the second jig for the second workpiece, the parameters include parameters for the first workpiece and parameters for the second workpiece, the parameters for the first workpiece include: a thickness of a part of the first workpiece which is supported by the first jig; a thickness of a part of the first workpiece which is to be fastened to the second workpiece; a tilt of the first workpiece to a horizontal plane; or a height of a contact surface of the first jig which comes into contact with the first workpiece, the parameters for the second workpiece include: a thickness of a part of the second workpiece which is to be fastened to the first workpiece; or a height of a contact surface of the second jig which comes into contact with the second workpiece, and the at least one processor is configured to execute the instructions to:

in response to selecting the correction procedure, input the corrected parameters into the trained latest estimation model to derive a corrected estimation value of the length of the gap; and select, where the corrected estimation value of the length of the gap falls within an application range, the second standard shim from among the predetermined standard shims.

2. The manufacturing assistance apparatus according to claim 1, wherein the at least one processor is configured to execute the instructions to:

derive a median of lengths of gaps each of which corresponds to the gap from the pieces of the actual measurement data, and determine whether any of the predetermined standard shims is available based on the estimation value of the length of the gap, the median and a tolerance of the gap.

3. The manufacturing assistance apparatus according to claim 1, wherein the at least one processor is configured to execute the instructions to narrow down a tolerance of each of the parameters based on the order of the magnitude of the influence.

4. The manufacturing assistance apparatus according to claim 1, wherein the parameters include positions of the first jig and the second jig, deformation amounts upon pressing the first workpiece against the first jig and the second workpiece against the second jig, and a tolerance measurement value after fastening the first workpiece with the second workpieces.

5. The manufacturing assistance apparatus according to claim 1, wherein the at least one processor is configured to execute the instructions to:

repeat selecting a correction procedure from the predetermined correction procedures to be the correction procedure, in a case where there is still an applicable correction procedure that has not been selected in the predetermined correction procedures, until the standard shim is selected.

6. A manufacturing assistance apparatus comprising circuitry configured to:

load pieces of actual measurement data in each of which a gap and parameters are associated with each other, the gap being provided between a first workpiece and a second workpiece that eventually structure an airframe of an aircraft and that are eventually fastened to each other, construct a trained estimation model on a basis of machine learning in which the pieces of actual measurement data serve as teacher data, the trained estimation model estimating the gap from the parameters, input the parameters into the trained latest estimation model to derive an estimation value of a length of the gap on which measurement has not yet been performed, wherein the trained latest estimation model is trained by inputting the teacher data comprising latest actual measurement data into the constructed trained estimation model to execute the constructed trained estimation model, select, when determining that the estimation value of the length of the gap falls within an application range, a first standard shim from among predetermined standard shims, identify an order of magnitude of influence by the parameters exerted on the estimation value of the length of the gap based on test data that is related to the parameters, select a correction procedure and a second standard shim of the predetermined standard shims, based on determining that (i) the estimation value of the length of the gap falls outside the application range, (ii) there is a selectable correction procedure from predetermined correction procedures to allow the gap to be closer to the application range, and (iii) the correction procedure has a largest magnitude of influence among the correction procedures and is selected based on the order of the magnitude of the influence by the parameters, each of the predetermined correction procedures being associated with one or more correction values for the parameters and stored in a storage, wherein the correction procedures correct the parameters to generate corrected input for the trained latest estimation model, select, a dedicated shim different from the predetermined standard shims, based on determining that (i) the estimation value of the length of the gap falls outside the application range and (ii) there is no correction procedure selectable from the predetermined correction procedures to allow the gap to be closer to the application range;

update, in response to selecting the correction procedure, the corrected parameters into updated parameters corresponding to the selected correction procedure based on the one or more correction values, wherein the predetermined correction procedures include replacing a related component part, performing a machining process on the related component part, changing positions of a first jig for the first workpiece or a second jig for the second workpiece, or changing a temperature around the related component part, the related component part is the first workpiece, the second workpiece, the first jig for the first workpiece, or the second jig for the second workpiece, the parameters include parameters for the first workpiece and parameters for the second workpiece, the parameters for the first workpiece include: a thickness of a part of the first workpiece which is supported by the first jig; a thickness of a part of the first workpiece which is to be fastened to the second workpiece; a tilt of the first workpiece to a horizontal plane; or a height of a contact surface of the first jig which comes into contact with the first workpiece, the parameters for the second workpiece include: a thickness of a part of the second workpiece which is to be fastened to the first workpiece; or a height of a contact surface of the second jig which comes into contact with the second workpiece, and the circuitry is configured to:
in response to selecting the correction procedure, input the corrected parameters into the trained latest estimation model to derive a corrected estimation value of the length of the gap; and
select, where the corrected estimation value of the length of the gap falls within an application range, the second standard shim from among the predetermined standard shims.

7. The manufacturing assistance apparatus according to claim 6, wherein the circuitry is configured to:
derive a median of lengths of gaps each of which corresponds to the gap from the pieces of the actual measurement data, and
determine whether any of the predetermined standard shims is available based on the estimation value of the length of the gap, the median and a tolerance of the gap.

8. The manufacturing assistance apparatus according to claim 6, wherein the circuitry is configured to narrow down a tolerance of each of the parameters based on the order of the magnitude of the influence.

9. The manufacturing assistance apparatus according to claim 6, wherein the parameters include positions of the first jig and the second jig, deformation amounts upon pressing the first workpiece against the first jig and the second workpiece against the second jig, and a tolerance measurement value after fastening the first workpiece with the second workpieces.

10. The manufacturing assistance apparatus according to claim 6, wherein the at least one processor is configured to execute the instructions to:
repeat selecting a correction procedure from the predetermined correction procedures to be the correction procedure, in a case where there is still an applicable correction procedure that has not been selected in the predetermined correction procedures, until the standard shim is selected.

* * * * *